(12) United States Patent
Inui et al.

(10) Patent No.: US 6,851,885 B2
(45) Date of Patent: Feb. 8, 2005

(54) LEVER AND A METHOD FOR PROVIDING THE SAME

(75) Inventors: Hiroatsu Inui, Saitama (JP); Sakae Mizumura, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 16 days.

(21) Appl. No.: 10/124,471

(22) Filed: Apr. 18, 2002

(65) Prior Publication Data

US 2002/0108999 A1 Aug. 15, 2002

Related U.S. Application Data

(62) Division of application No. 09/394,504, filed on Sep. 13, 1999.

(30) Foreign Application Priority Data

Sep. 14, 1998 (JP) .......................................... 10-279425

(51) Int. Cl.[7] .............................................. B23K 27/00
(52) U.S. Cl. ...................................... 403/271; 403/230
(58) Field of Search ................................ 403/270–272, 403/230, 231, 232.1, 244, 256

(56) References Cited

U.S. PATENT DOCUMENTS

| | | | |
|---|---|---|---|
| 2,779,612 A | * | 1/1957 | Edelen .................... 403/271 X |
| 3,631,585 A | * | 1/1972 | Stamm ................... 403/270 X |
| 3,724,627 A | | 4/1973 | Rhodes |
| 3,975,107 A | * | 8/1976 | Molyneux et al. .......... 403/271 |
| 4,298,108 A | | 11/1981 | Hutchinson |
| 4,520,903 A | | 6/1985 | Arnold et al. |
| 4,602,504 A | | 7/1986 | Barber |
| 4,620,623 A | | 11/1986 | Barksdale |
| 5,054,571 A | | 10/1991 | Takasaka |
| 5,076,406 A | | 12/1991 | Gregory et al. |
| 5,076,484 A | * | 12/1991 | Ito et al. ................. 403/272 X |
| 5,441,241 A | * | 8/1995 | McKim ................. 403/270 X |
| 5,560,388 A | | 10/1996 | Caldwell |
| 5,573,365 A | | 11/1996 | Michalski |
| 5,992,260 A | | 11/1999 | Fujiki et al. |

OTHER PUBLICATIONS

J. Ruge, Handbuch der Schweisstechnik (★Handbook of Welding Engineering), vol. III, Konstruktive Gestaltung der Bauteile (★Constuctional Design of the Structural Parts), Springer–Verlag 1985.

J. Ruge, Handbuch der Schweisstechnik (★Handbook of Welding Engineering), vol. IV, Berechnung von Schweissverbindungen (★Calculation of Weld Joints), Springer–Verlag 1988.

* cited by examiner

Primary Examiner—John R. Cottingham
(74) Attorney, Agent, or Firm—Birch, Stewart, Kolasch & Birch, LLP.

(57) ABSTRACT

A connecting indentation or protrusion section is formed on one end section of an arm member of a lever, and by pressing one end section of a shaft pipe member to a indentation or protusion of the arm member the two members are engaged. The two members are integrally formed by fillet welding to from a clutch control lever for a motorcycle.

20 Claims, 4 Drawing Sheets

LEVER AND A METHOD FOR PROVIDING THE SAME

This application is a divisional of co-pending application Ser. No. 09/394,504, filed on Sep. 13, 1999, the entire contents of which are hereby incorporated by reference and for which priority is claimed under 35 U.S.C. § 120; and this application claims priority of application Ser. No. 10-279425 filed in Japan on Sep. 14, 1998 under 35 U.S.C. § 119.

BACKGROUND OF THE INVENTION

1. Field of the Invention

The present invention relates to a method of joining two members of a lever for use as a clutch control lever for a motorcycle.

2. Description of Background Art

FIG. 4 shows an example of the conventional method of joining members applicable to a clutch lever. In this example, the members are formed integrally by making a hole b in one end of a lever arm a. Next, a small diameter step section d formed on one end of a solid shaft c is inlaid in the hole b. Then, the two pieces are welded to form one contiguous piece. Finally, a seal plug f is placed over the hole b in order to prevent an lubrication oil which may seep into the solid shaft c from escaping.

The clutch lever described above has specific structural limitations which cause the method of construction thereof to be cumbersome. Specifically, the lever arm a must be bored at one end thereof, and an end of the solid shaft c must be machined to form the small diameter step section d so that it will easily join with the lever arm a. Also, the solid shaft c must be bored in order to reduce the weight of the clutch lever. The object of the present invention is to solve the above problems of the conventional method of constructing a clutch lever.

SUMMARY OF THE INVENTION

To overcome the disadvantages of the conventional method, the present invention provides a shaft member and an arm member which are integrally joined by welding after an indented or convex engagement section, formed on a plate-shaped arm member beforehand, and the shaft member are engaged. Therefore, a boring process for the arm member and machining of the shaft member are made unnecessary. In addition, the positioning work when joining the two members is eliminated.

More specifically, according to the present invention, the shaft member is a hollow shaft. The hollow shaft member is positioned on an engagement section of the arm member. A weld line is placed around the abutting circumference of the hollow shaft member with the arm member in order to contiguously join the two members. Since the hollow shaft member may be a simple tube structure, the need for boring of the shaft member is eliminated, but the desirable reduction in weight is achieved. Moreover, the arm member serves as a cover for the shaft member thereby eliminating the need for a special sealing structure such as a plug on the axial end section.

Still further, the present invention is applied to a lever arm capable of rotating around the shaft member so that it is possible to obtain a lever arm that can be easily manufactured.

Moreover, the outside of the axial end section of the shaft member is engaged in the indented section formed as an engagement section of the arm member and joined by welding so that it is possible to apply to either a hollow or a solid shaft, thereby obtaining a general purpose lever arm.

Subsequently, if the shaft member is a clutch lever shaft for a motorcycle and the arm member is a clutch control lever, it is possible to obtain a light-weight clutch release mechanism which has a simple construction process. In addition, there is a possibility that, if the clutch lever shaft is made hollow, lubrication oil may enter from the clutch side into the hollow section. However, a seal structure to by means of a special plug can be eliminated because it is possible to seal the hollow section by using the clutch control lever as a cover.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
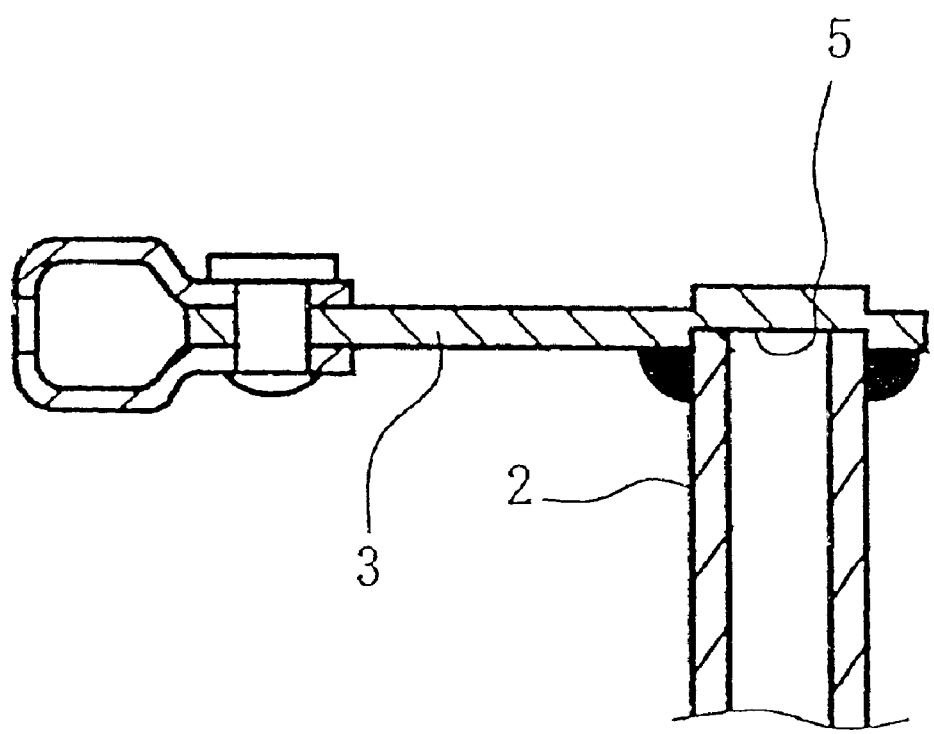
FIG. 1 is a cross-sectional view of a clutch lever in accordance with the first embodiment of the present invention.
Figure 2:
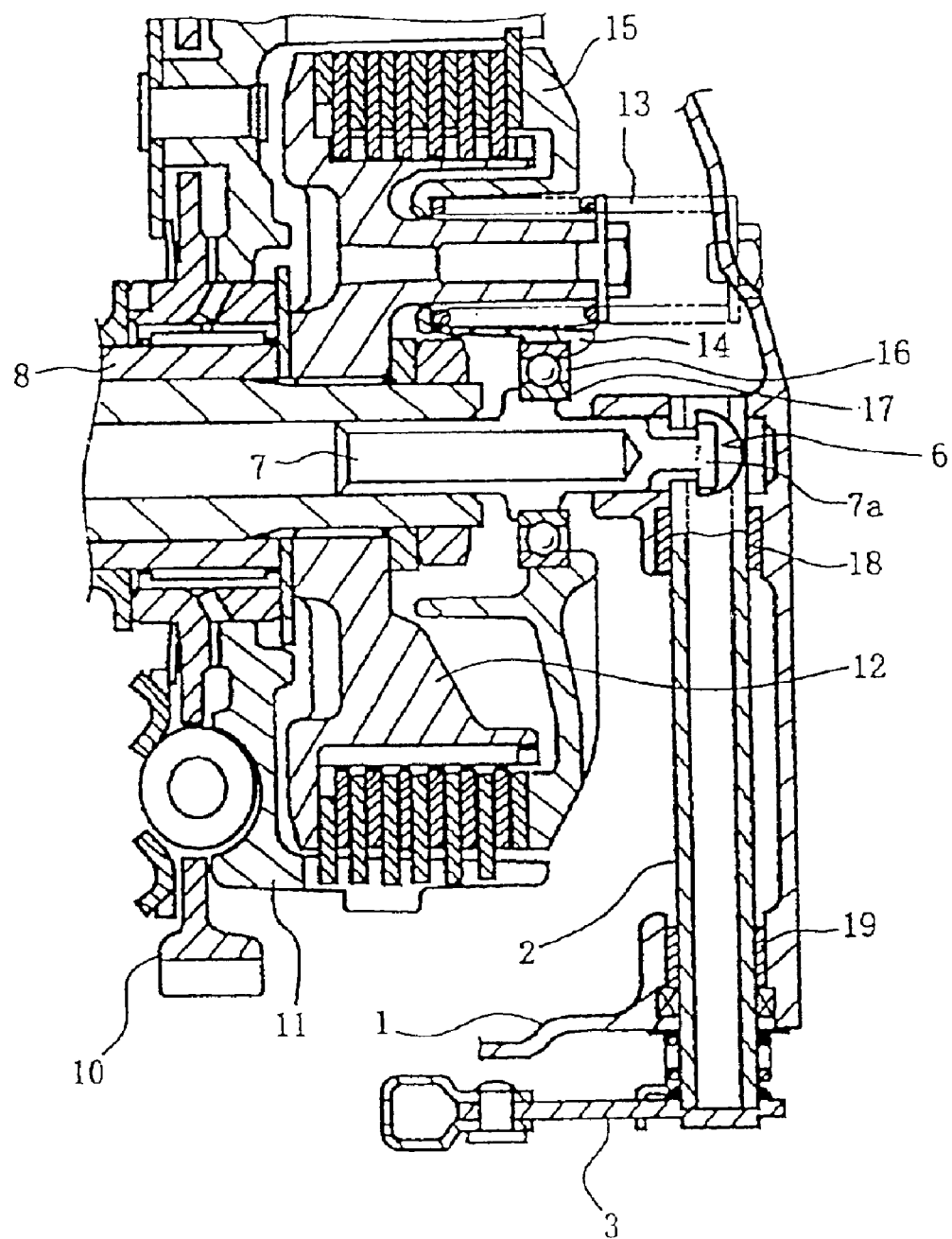
FIG. 2 illustrates a clutch release mechanism and the clutch lever of the present invention as it is applied to a motorcycle.

The first embodiment will be described with reference to FIGS. 1 and 2. As seen in FIG. 2, a clutch lever shaft 2 is provided in a crankcase 1. A clutch control lever 3 is attached on a projecting end outside the crankcase 1, and is operated by a clutch cable (not indicated in the drawing.) connected to another end thereof.

The other end section of the clutch lever shaft 2 is contained in the crankcase 1. An engagement hole 6 is formed in the side surface of the axial end section, and a tip connecting section 7a of a lifter pin 7 is engaged in the engagement hole 6. The other end of the lifter pin 7 is engaged in a shaft hole of a main shaft 8.

Also shown in FIG. 2 is a primary gear 10, a clutch inner 19, clutch springs 13 and 14, bushings 18 and 19, and a lifter 15 which is supported on an outside circumference of the lifter pin 7 through a bearing 16. When the lifter pin 7 moves in the lift direction (right side of the drawing), the lifter 15 moves in the same direction against the clutch springs 13 and 14, thereby disengaging the clutch.

The inside of crankcase 1 is partly soaked with lubrication oil. The end section within the crankcase 1 forms an open right side, therefore presenting a possibility that the lubrication oil may enter the clutch lever shaft 2 through this opening. However, in order to prevent leaking thereof, the outside end section of the clutch lever shaft 2 is tightly sealed by the clutch control lever 3 serving as a cover.

As illustrated in FIG. 2, the plate-shaped clutch control lever 3 is made of an appropriate metal material. The plate-shaped clutch control lever 3 has a connecting indented section 5 made by means of press-machining and provided on the connecting inside end section of the clutch lever shaft 2 in the longitudinal direction thereof.

The clutch lever shaft 2 is made of a pipe-shaped member. One end section of the clutch lever shaft 2 is engaged to the connecting indented section 5 for positioning and is integrally joined thereto by fillet welding.

The effects of this invention will be described hereinafter. The clutch lever shaft 2 is formed with a pipe member, and joined to the clutch control lever 3 simply by engaging the axial end section in the connecting indented section 5 of the clutch control lever 3. The clutch lever shaft 2 and the clutch control lever are then joined by fillet welding around the engagement section. Therefore, providing a lightweight clutch control lever achieved using a reduced number of machining steps.

In addition, it is possible to prevent lubrication oil from entering the clutch lever shaft 2 from the open end in the crankcase 1 by means of the clutch control lever 3, thereby eliminating the need for a separate plug. Moreover, the positioning is made easier at the time of welding by engaging the clutch control lever 3 in the connecting indent 5.

Figure 3:
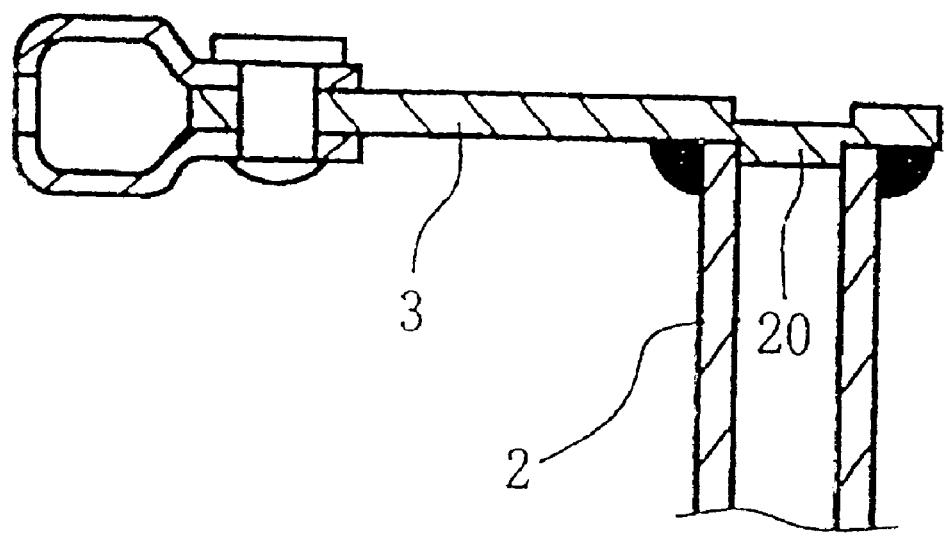
FIG. 3 is a cross-sectional view of the clutch lever in accordance to the second embodiment of the present invention.
Figure 4:
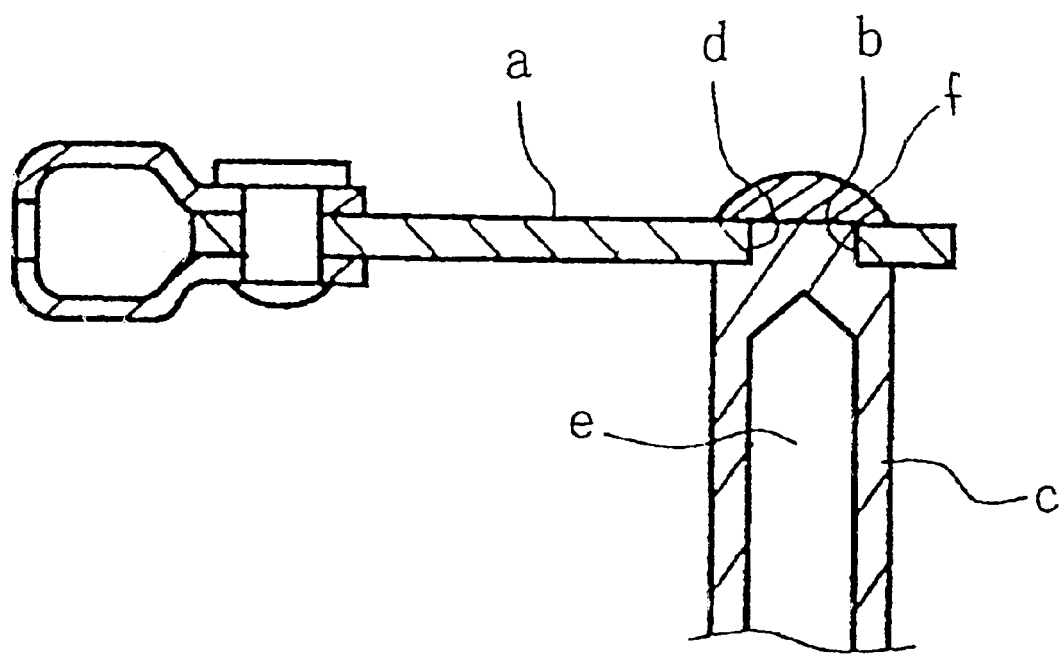
FIG. 4 is a cross-sectional view of a clutch lever in of a conventional art example.

The second embodiment will be described by way of FIG. 3. In the second embodiment, the joining section for the clutch lever shaft 2 is an projecting section 20 provided so as to engage in one section of the clutch control lever 3. This projecting section 20 has a column shape having the same diameter as the inside diameter of the clutch lever shaft 2.

In this case, the clutch control lever 3 is joined to the clutch lever shaft 2 by fillet welding of the clutch control lever 3 to the clutch lever shaft 2 after positioning the projecting section 20 in a hole in the outside end section of the control lever shaft 2.

Therefore, the second embodiment in accordance with the present invention obtains the same advantages as with the previous embodiment. The same reference numerals are used for the same parts as in the previous embodiment.

This invention is not limited by the above described embodiments, and various modifications are possible. For example, it is possible to perform resistance welding, or friction welding instead of the fillet welding. Moreover, it is possible to use a solid member in place of a hollow member, and in this case, it is favorable to provide the engagement section with an indented shape. Furthermore, it is possible to apply the invention to a junction structure for a plate-shaped lever arm and pipe-shaped member without being limited to the column member.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lever in a crankcase, comprising:
   a plate-shaped arm member having a receiving portion being an integral part thereof;
   a shaft member having a connecting portion on an end thereof;
   wherein the connecting portion of the shaft member and the receiving portion of the arm member are joined together and fillet welded at least along an edge portion of the connecting portion for covering the end of the shaft member and preventing an escape of a lubricating oil which may seep into the shall member, a fillet weld line being disposed in a corner formed by an outer circumference of the shaft member abutting with the plate-shaped arm member.

2. The lever as set forth in claim 1, wherein the receiving portion is concave or convex in shape, the receiving portion being formed by press-machining.

3. The lever as set forth in claim 1, wherein the shaft member is hollow thereby allowing the hollow portion thereof to connect with the receiving portion of the arm member, the receiving portion being either convex or concave in shape.

4. The lever as set forth in claim 3, wherein the hollow shaft member encompasses and receives in the hollow portion thereof the receiving portion when the receiving portion is convex, or alternatively, an outer diameter of the hollow shaft member is inset in the receiving portion when the receiving portion is concave.

5. The lever as set forth in claim 1, wherein the shaft member is a tube shaft, and a projecting section formed as the receiving portion of the arm member is engaged inside the shaft member, and the two are joined by welding.

6. The lever as set forth in claim 1, wherein an outside of an axial end section of the shaft member is engaged in an indented section formed as the receiving portion of the arm member, and the two are joined by welding.

7. The lever as disclosed in claim 1, wherein the shaft member is a clutch lever shaft for a motorcycle and the arm member is a clutch control lever.

8. The lever as disclosed in claim 3, wherein an angle between the hollow shaft member and the plate-shaped arm member is substantially 90°.

9. The lever as disclosed in claim 3, wherein the hollow shaft member has inner and outer dimensions along an entire length thereof that are substantially uniform.

10. The lever as disclosed in claim 1, wherein a side wall of the receiving portion is substantially perpendicular to a length of the arm member.

11. A lever in a crankcase, comprising:
    a plate-shaped arm member having a receiving portion being an integral part thereof;
    a shaft member having a connecting portion on an end thereof;
    wherein the connecting portion of the shaft member and the receiving portion of the arm member are joined together and fillet welded at least along an outer circumferential wall of the connecting portion for closing the end of the shaft member and preventing an escape of a lubricating oil which may seep into the shaft member, the receiving portion including a side wall having a surface substantially parallel to a length of the shaft member, wherein at least a portion of a surface of a circumferential wall the shaft member overlaps with and fits against the surface of the side wall of the receiving portion.

12. The lever as set forth in claim 11, wherein the receiving portion is concave or convex in shape, the receiving portion being formed by press-machining.

13. The lever as set forth in claim 11, wherein the shaft member is hollow thereby allowing a hollow portion thereof to connect with the receiving portion of the arm member, the receiving portion being either convex or concave in shape.

14. The lever as set forth in claim 13, wherein the shaft member encompasses and receives in the hollow portion thereof the receiving portion when the receiving portion is convex, or alternatively, an outer diameter of the shaft member is inset in the receiving portion when the receiving portion is concave.

15. The lever as set forth in claim 11, wherein the shaft member is a hollow tube shaft, and a projecting section formed as the receiving portion of the arm member is engaged inside the shaft member, and the two are joined by welding.

16. The lever as set forth in claim 11, wherein an outside of an axial end section of the shaft member is engaged in an indented section formed as the receiving portion of the arm member, and the two are joined by welding.

17. The lever as disclosed in claim 11, wherein the shaft member is a clutch lever shaft for a motorcycle and the arm member is a clutch control lever.

18. The lever as disclosed in claim 11, wherein an angle between an end of the shaft member and the plate-shaped arm member is substantially 90°.

19. The lever as disclosed in claim 11, wherein the shaft member has inner and outer dimensions along an entire length thereof that are substantially uniform.

20. The lever as disclosed in claim 11, wherein the plate-shaped arm member is provided with a bulge opposite to the receiving portion when the receiving portion is concave in shape, and the plate-shaped arm member is provided with a depression opposite to the receiving portion when the receiving portion is convex in shape.

* * * * *